Patented Mar. 9, 1926.

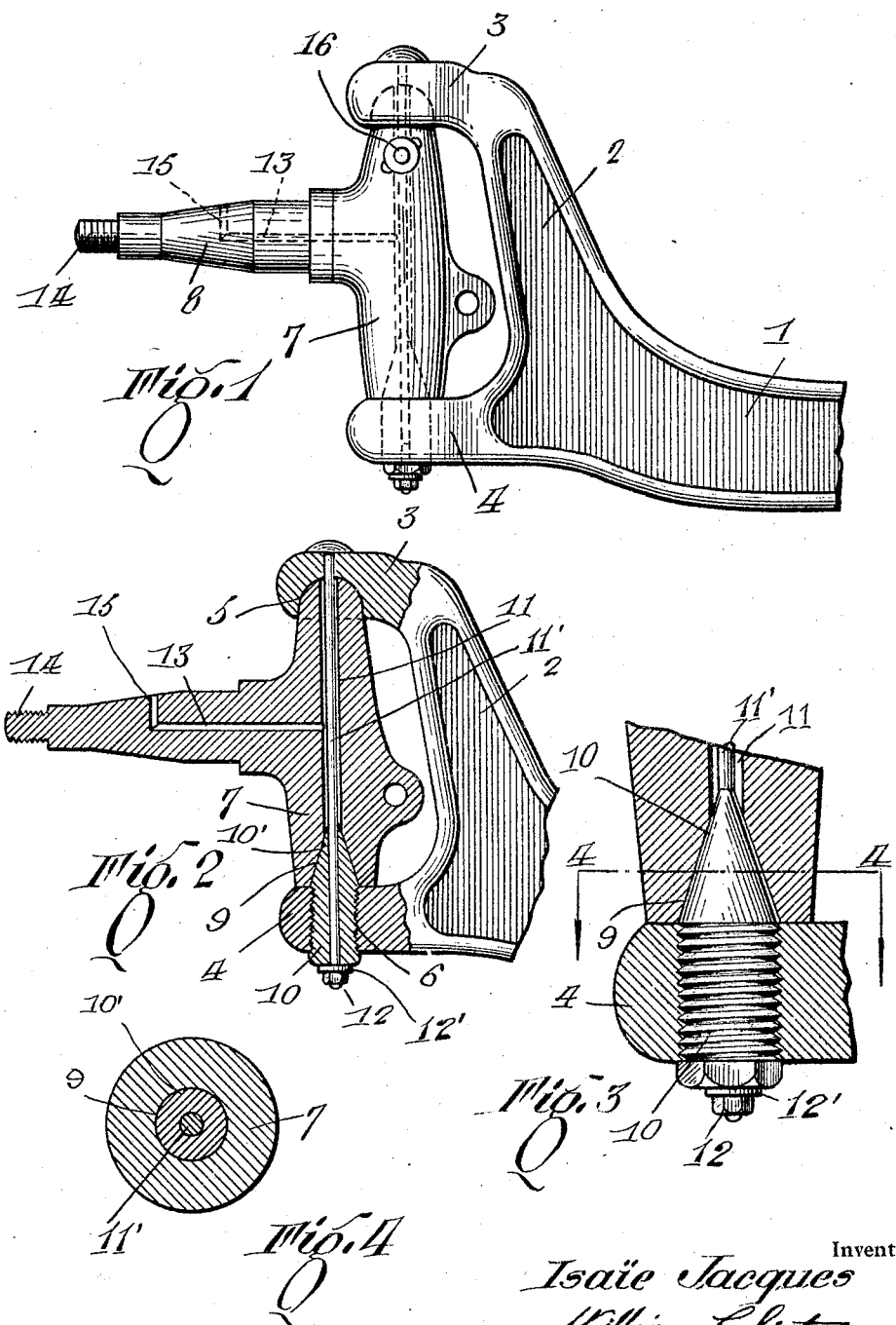

1,576,329

UNITED STATES PATENT OFFICE.

ISAIE JACQUES, OF GRANBY, QUEBEC, CANADA.

ADJUSTABLE DUSTPROOF AND RUSTPROOF AXLE.

Application filed January 22, 1925. Serial No. 4,099.

*To all whom it may concern:*

Be it known that I, ISAIE JACQUES, a subject of the King of Great Britain, residing at Granby, Province of Quebec, Canada, have invented certain new and useful Improvements in Adjustable Dustproof and Rustproof Axles; and I do hereby declare that the following is a full, clear, and exact description of the invention, such as will enable others skilled in the art to which it appertains to make and use the same.

The present invention pertains to a novel front axle for an automobile, designed particularly in connection with the steering apparatus.

The primary object of the invention is to provide a device of this character wherein the bearing surfaces may be constantly lubricated to prevent rusting and at the same time covered to prevent the entrance of water and dirt. In the accomplishment of this object, one of the fingers of the yoke has a cavity in which is received one of the ends of the spindle bolt. The remaining end of the bolt rests on the remaining finger of the yoke and is formed with a conical cavity. A nut having a conical tip is threaded through the adjacent finger so that the tip fits into the conical cavity. Thus, both ends of the spindle bolt are covered by the fingers. A lubricant duct is formed longitudinally through the bolt, extending to the ends thereof so that it may deliver to the bearing surfaces. Lubricant is forced into the duct through an oiler carried by the spindle bolt. For the purpose of locking all the parts together, a pin is passed through the spindle bolt and nut, having a head at one end and a lock nut at the other.

Another object of the invention is to provide a bearing between the ends or the spindle bolt and the yoke fingers which may be adjusted at will and locked in position to prevent the parts from becoming loose and to compensate for wear at the bearings. This function is accomplished by adjustment of the lock nut above referred to.

The invention is fully disclosed in the following description and in the accompanying drawings in which:

Figure 1 is an elevation of an end of a front axle, showing the invention applied thereto;

Figure 2 is a vertical section thereof;

Figure 3 is a detail section; and,

Figure 4 is a section on the line 4—4 of Figure 3.

Reference to these views will now be made by means of like characters which are employed to designate corresponding parts throughout.

The numeral 1 indicates the body of the axle terminating at each end in a yoke 2 from the ends of which project an upper finger 3 and a lower finger 4. It is to be noted that the upper finger, as distinguished from the prior art, is practically solid, having only a concave recess 5 cut in its lower surface. The lower finger 4 is formed with a threaded aperture 6, the purpose of which is pointed out below.

The spindle bolt 7 has its upper end received in the recess 5 and its lower end resting upon the lower finger 4. The wheel spindle 8 is integral with the bolt and extends therefrom at an angle of 90°.

A conical recess 9 is cut upwardly from the lower end of the spindle and is normally in alinement with the threaded aperture 6. A nut 10 having a blank conical end 10' is threaded through the aperture 6 so that this end substantially fills the conical recess 9. The lower end of the bolt is thus fixed to the yoke, while the upper end is held in the recess 5.

An oil duct 11 is formed longitudinally through the bolt 7. Through this duct is passed a pin 11', the latter also passing through the nut 10. The threaded end of the pin, disposed exteriorly of the nut 10, carries a lock nut 12 and a lock washer 12' interposed between the nuts 10 and 12. A communicating duct 13 extends from the duct 11 axially along the spindle 8 and has a short branch 15 leading to the surface of the spindle. Access to the passage 11 is obtained by means of an oiler 16 supported at the upper end of the spindle bolt 7.

In the use of the device, oil is forced into the main duct 11 and communicating branches through the oiler 16.

From the duct 11 the lubricant enters the cavity 5 to lubricate the upper end of the spindle bolt and also enters between the conical surfaces of the recess 9 and nut end 10' to lubricate the parts in this region. These bearings, being completely covered by the fingers 3 and 4, render the device dustproof and waterproof, and also keep the moving parts constantly lubricated. Obviously, the lubricant will also flow through the ducts 15 and 16 to the contacting surfaces of the spindle 8 and hub of the wheel carried thereby.

In order to permit perfect adjustment of the parts, the lock nut 12 is tightened as the parts wear away adjacent and at the ends of the spindle bolt 7. In this manner, the bearing surfaces at the ends of the spindle bolt are constantly maintained in dustproof and waterproof condition.

While a specific embodiment of the invention has been illustrated and described, it is to be understood that various alterations in the details of construction may be made without departing from the spirit of the invention as indicated by the appended claims.

Having thus fully described the invention, what I claim as new and desire to protect by Letters Patent is:—

1. A dust and rustproof axle comprising a yoke having a pair of fingers extending therefrom, one of said fingers having a cavity formed in its inner surface, the remaining finger having a threaded aperture, a spindle having one end received in said cavity and its remaining end resting on the apertured finger, said remaining end having a conical cavity, a nut threaded through said aperture and having a conical end received in said conical cavity, said bolt having a lubricant duct formed longitudinally therethrough and a pin loosely fitted in said duct and secured to said nut and the opposite finger.

2. A dust and rustproof axle comprising a yoke having an upper and a lower finger, said upper finger having a cavity cut therein, a spindle bolt having one end received in said cavity and the remaining end resting on the lower finger, said lower finger having a threaded aperture, the lower end of the bolt having a conical recess, a nut threaded through said aperture and having a conical end received in said conical recess, said bolt having a lubricant duct formed longitudinally therethrough, and a pin loosely fitted in said duct and secured to said nut and the opposite finger.

In witness whereof I have hereunto set my hand.

ISAIE JACQUES.